(12) United States Patent
Carlton

(10) Patent No.: US 8,016,316 B1
(45) Date of Patent: Sep. 13, 2011

(54) PNEUMATIC DROP FRAME TRAILER

(76) Inventor: William Carlton, Houston, TX (US)

( * ) Notice: Subject to any disclaimer, the term of this patent is extended or adjusted under 35 U.S.C. 154(b) by 378 days.

(21) Appl. No.: 12/215,471

(22) Filed: Jun. 27, 2008

Related U.S. Application Data

(60) Provisional application No. 60/946,611, filed on Jun. 27, 2007.

(51) Int. Cl.
*B62B 1/00* (2006.01)
*B60G 17/00* (2006.01)
*B60S 9/00* (2006.01)
*B60P 1/00* (2006.01)

(52) U.S. Cl. ....... 280/656; 280/789; 280/6.15; 414/474; 414/476; 414/481; 414/482; 414/483

(58) Field of Classification Search ............ 280/656, 280/789, 30, 86.5, 6.15, 490; 414/474, 476, 414/481–483, 485
See application file for complete search history.

(56) References Cited

U.S. PATENT DOCUMENTS

| 2,957,593 | A | | 10/1960 | Evans |
| 3,866,935 | A | * | 2/1975 | Nelson ..................... 280/43.23 |
| 5,366,336 | A | * | 11/1994 | Friesen et al. ................ 414/476 |
| 6,349,952 | B1 | * | 2/2002 | Kallstrom ............. 280/124.157 |
| 6,382,647 | B1 | | 5/2002 | Smith |
| 6,857,643 | B2 | * | 2/2005 | Neider ....................... 280/43.18 |
| 7,281,728 | B1 | * | 10/2007 | Wayrynen ................. 280/414.1 |
| 2006/0045693 | A1 | * | 3/2006 | Elliot et al. .................... 414/481 |

* cited by examiner

*Primary Examiner* — John R Olszewski
(74) *Attorney, Agent, or Firm* — Kenneth A. Roddy

(57) ABSTRACT

A pneumatic drop frame trailer has lateral wheels connected to the frame by pivotal wheel support arms with airbags between the support arms and frame, a pivotal tongue member with an airbag between the tongue and the frame, a deck having an inclined ramp portion at the rear end, and a control box on the deck containing an air compressor, air storage tank, and associated valves and controls. The wheel airbags and tongue airbag can be inflated or deflated while hitched to a vehicle to raise or lower the frame evenly and horizontally relative to the ground and may also be inflated to provide stiffness or shock absorbing characteristics. When the wheel airbags are deflated, the bottom of the frame is disposed substantially horizontally and very close to the ground surface with the ramp portion substantially flush with the ground surface in a loading and unloading position.

6 Claims, 9 Drawing Sheets

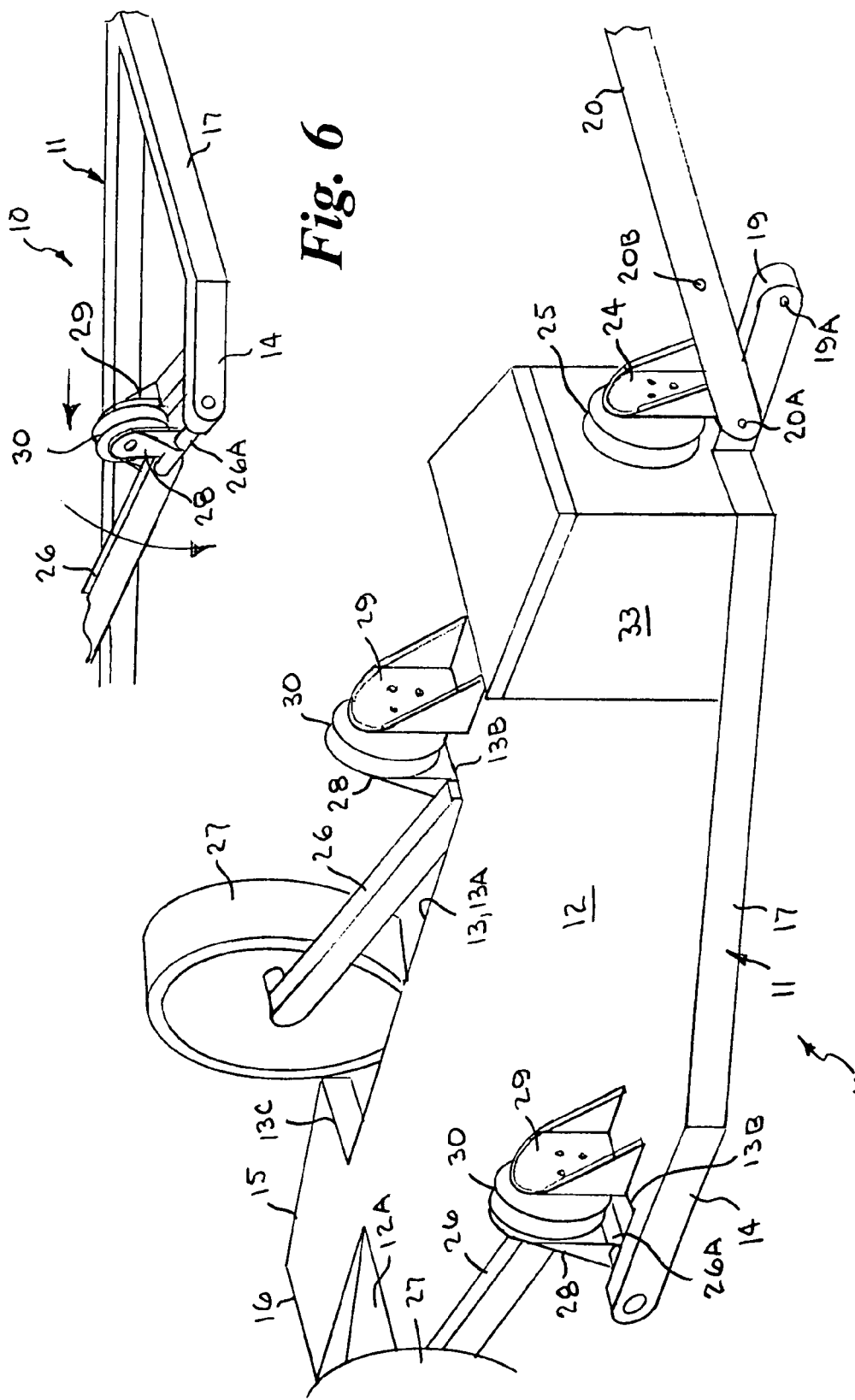

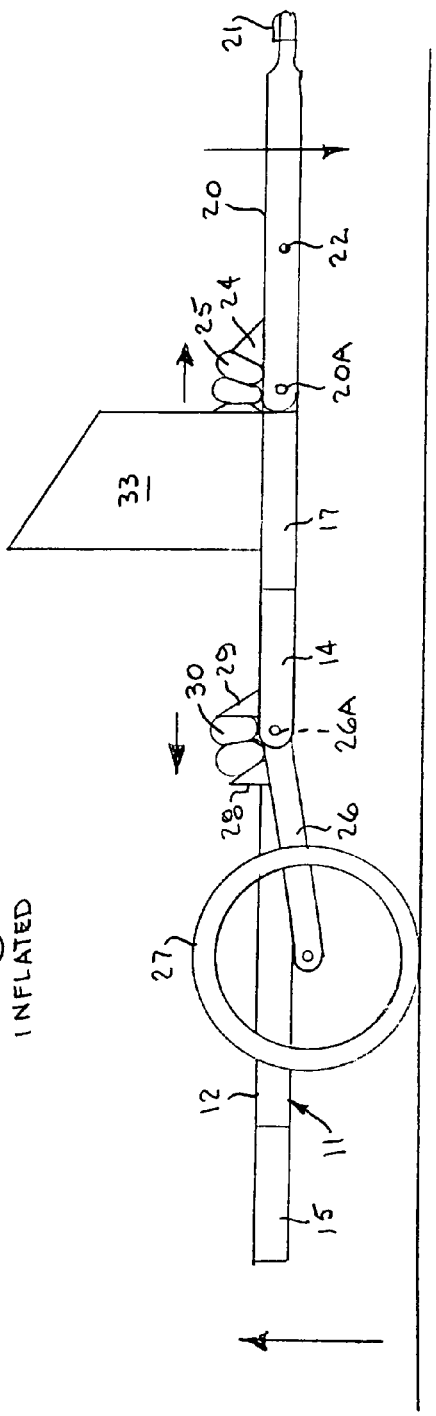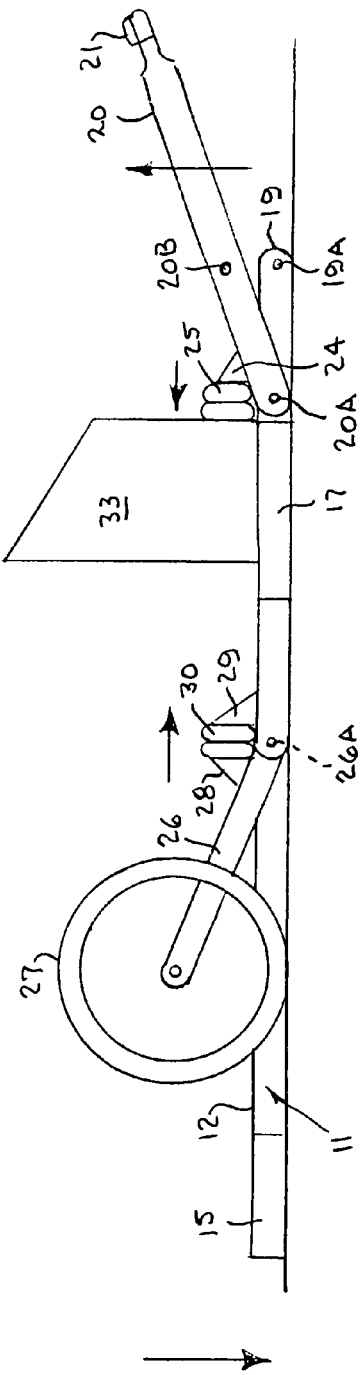
*Fig. 7*
INFLATED
*Fig. 8*
DEFLATED

PNEUMATIC DROP FRAME TRAILER

CROSS REFERENCE TO RELATED APPLICATION

This application claims priority of U.S. Provisional Patent Application Ser. No. 60/946,611, filed Jun. 27, 2007.

BACKGROUND OF THE INVENTION

1. Field of the Invention

This invention relates generally to pneumatic trailers, and more particularly to a pneumatic drop frame trailer having a pneumatic suspension system that moves the trailer chassis between a lowered loading and unloading position disposed horizontally on a support surface and a raised towing and load-carrying position supported by pressurized air bladders.

2. Brief Description of the Prior Art

Trailers for towing such items as motorcycles behind a car, truck or recreational vehicle are well known. The common trailer design consists of a solid axle to which wheels are mounted on opposite ends of the axle. Springs are attached to the axle at the widest location. The forward spring attachment is rigidly secured to an outside frame member for fore-to-aft axle stability and is attached to a rigid frame mount by a flexible spring hanger at the rearward end of the frame member. Typically, two longitudinal frame members are joined by load-carrying, transverse frame members upon which the trailer deck is mounted. The deck, by necessity, is located above the axle the distance of the upward wheel travel plus the thickness of the deck and deck frame. It is not uncommon for trailers to have a deck positioned 6" or so above the center of the axle. When loading heavy items onto the trailer, it is common to utilize a ramp at the back end of the trailer or to tilt the trailer about the wheel axle to engage the ground and then move the items up the inclined ram or deck.

Trailers having pneumatic shock absorbers, air cylinders, or air bladders that perform a dual function of absorbing road shocks and of raising and lowering the trailer bed are also known in the art.

Smith, U.S. Pat. No. 6,382,647 discloses a trailer apparatus having pneumatic shock absorbers that perform a dual function of absorbing road shocks and of raising and lowering the trailer bed. The trailer apparatus also includes king pin elements which move between positive and negative caster to provide stability and ease of backing the trailer.

Kallstrom, U.S. Pat. No. 6,349,952 discloses a trailer with a frame having a center load receiving channel for a motorcycle or for a similar load with a pair of opposed laterally extending wheel axles pivotally mounted at their inward end near the center channel. Bladder type air cylinders extend between the frame and axles near the outer end of the axles. An air suspension system controls the inflation of the air cylinders during transit and allows the trailer to be lowered to a position close to the ground. The air cylinders are mounted inboard of the wheel assemblies and, thus, the wheels pivot upwardly and angularly inward from each side with respect to the longitudinal axis of the frame when the frame is lowered.

Evans, U.S. Pat. No. 2,957,593 discloses a boat trailer having air bags or casings for lowering one end of the trailer and connected by linkages with boat supporting rollers that are automatically raised when the end of the trailer is lowered to facilitate loading and unloading of a boat thereon.

The present invention is distinguished over the prior art in general, and these patents in particular by a pneumatic drop frame trailer having lateral wheels connected by a pivotal wheel support arm to the frame with airbags connected between the support arm and the frame, a pivotal tongue member with an airbag connected between the tongue and the frame, and a deck having an inclined ramp portion at the rear end. The wheel airbags may be inflated or deflated to selectively raise and lower the frame relative to the ground, and may also be inflated to provide the desired stiffness or shock absorbing characteristics for absorbing road shocks as the trailer is towed. The tongue airbag may be inflated or deflated to allow the frame and deck to be selectively raised and lowered with respect to the tongue and/or the towing vehicle. When the wheel airbags are deflated, the bottom of the frame is disposed substantially horizontally and supported on the ground surface in a loading and unloading position. When the trailer is hitched to a tow vehicle, the load supporting deck can be lowered evenly and horizontally positioned very close to the ground, and the rearward end of the ramp portion of the deck is substantially flush with the ground surface to facilitate moving items onto the deck. A control box disposed on the deck contains an air compressor, an air storage tank, and associated control elements including appropriate valves for inflating and deflating the airbags.

SUMMARY OF THE INVENTION

It is therefore an object of the present invention to provide a trailer having a pneumatic system for raising and lowering the deck in a horizontal position relative to the ground to facilitate the loading and unloading items thereon.

It is another object of this invention to provide a pneumatic drop frame trailer that can be lowered in a horizontal position onto the ground and having a deck with an inclined ramp portion at the rear thereof to facilitate the loading and unloading items thereon.

Another object of this invention is to provide a pneumatic drop frame trailer having a pneumatically pivotal tongue that allows the trailer to be raised and lowered in a horizontal position relative to the ground when hitched to a tow vehicle to eliminate the need to unhitch the trailer when loading and unloading items thereon.

A further object of this invention is to provide a pneumatic drop frame trailer that is simple in construction, inexpensive to manufacture and is rugged and reliable in operation Other objects of the invention will become apparent from time to time throughout the specification and claims as hereinafter related.

The above noted objects and other objects of the invention are accomplished by a pneumatic drop frame trailer having lateral wheels connected by a pivotal wheel support arm to the frame with airbags connected between the support arm and the frame, a pivotal tongue member with an airbag connected between the tongue and the frame, and a deck having an inclined ramp portion at the rear end. The wheel airbags may be inflated or deflated to selectively raise and lower the frame relative to the ground, and may also be inflated to provide the desired stiffness or shock absorbing characteristics for absorbing road shocks as the trailer is towed. The tongue airbag may be inflated or deflated to allow the frame and deck to be selectively raised and lowered with respect to the tongue and/or the towing vehicle. When the wheel airbags are deflated, the bottom of the frame is disposed substantially horizontally and supported on the ground surface in a loading and unloading position. When the trailer is hitched to a tow vehicle, the load supporting deck can be lowered evenly and horizontally positioned very close to the ground, and the rearward end of the ramp portion of the deck is substantially flush with the ground surface to facilitate moving items onto the deck. A control box disposed on the deck contains an air compressor, an air storage tank, and associated control elements including appropriate valves for inflating and deflating the airbags.

BRIEF DESCRIPTION OF THE DRAWINGS

FIG. 5 is a partial perspective view of the pneumatic drop frame trailer shown somewhat schematically in a lowered position, with the airbag covers removed.

FIG. 6 is a partial perspective view of the pneumatic drop frame trailer shown somewhat schematically with the deck removed and showing the movement of the wheel support arm.

FIGS. 7 and 8 are side elevation views of the pneumatic drop frame trailer shown somewhat schematically in a raised position, and in a lowered position, respectively, with the airbag covers removed.

DESCRIPTION OF THE PREFERRED EMBODIMENT

Figure 1:
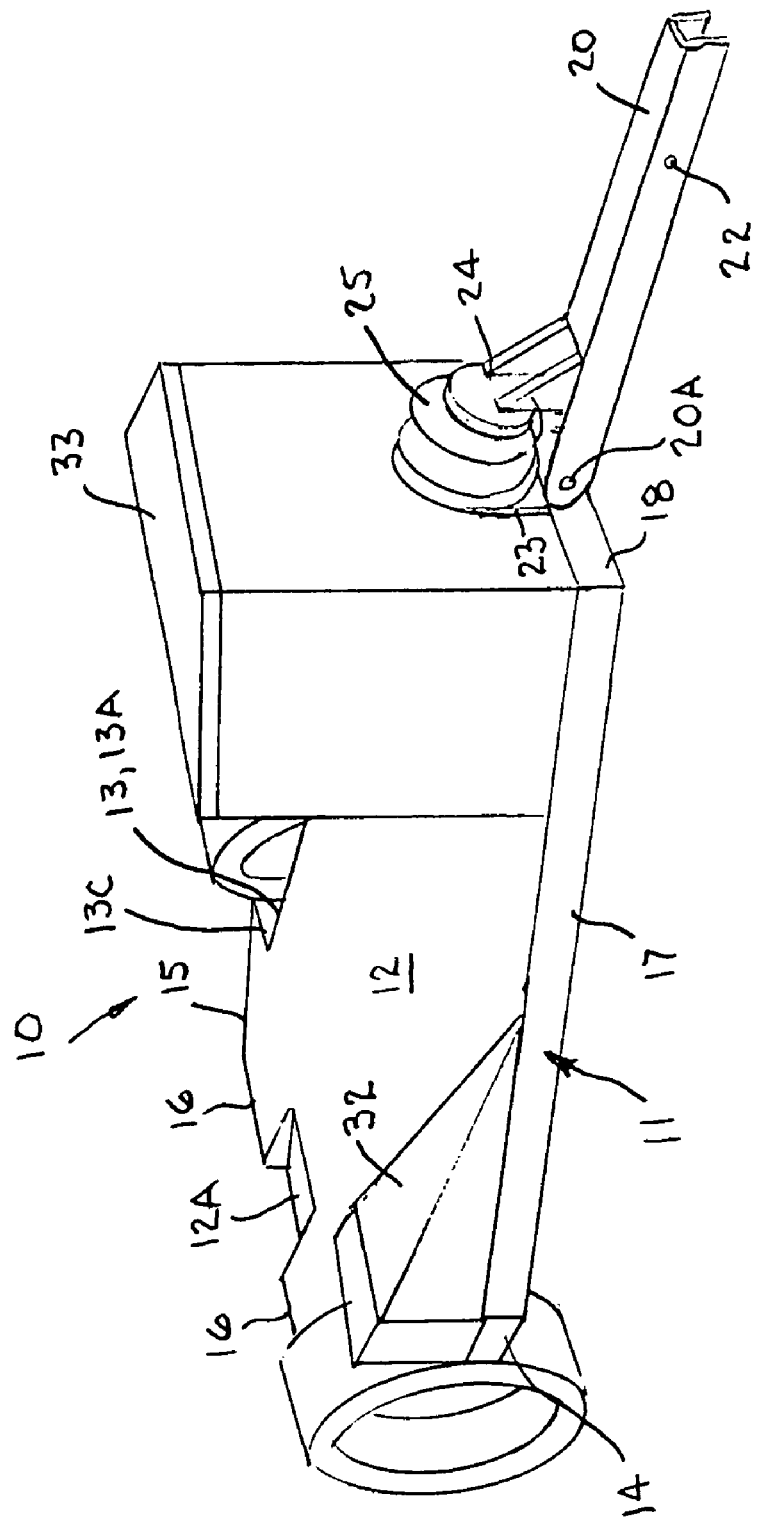
FIGS. 1 and 2 are perspective views of the pneumatic drop frame trailer in accordance with the present invention shown from the front, in a raised position, and in a lowered position, respectively.
Figure 2:
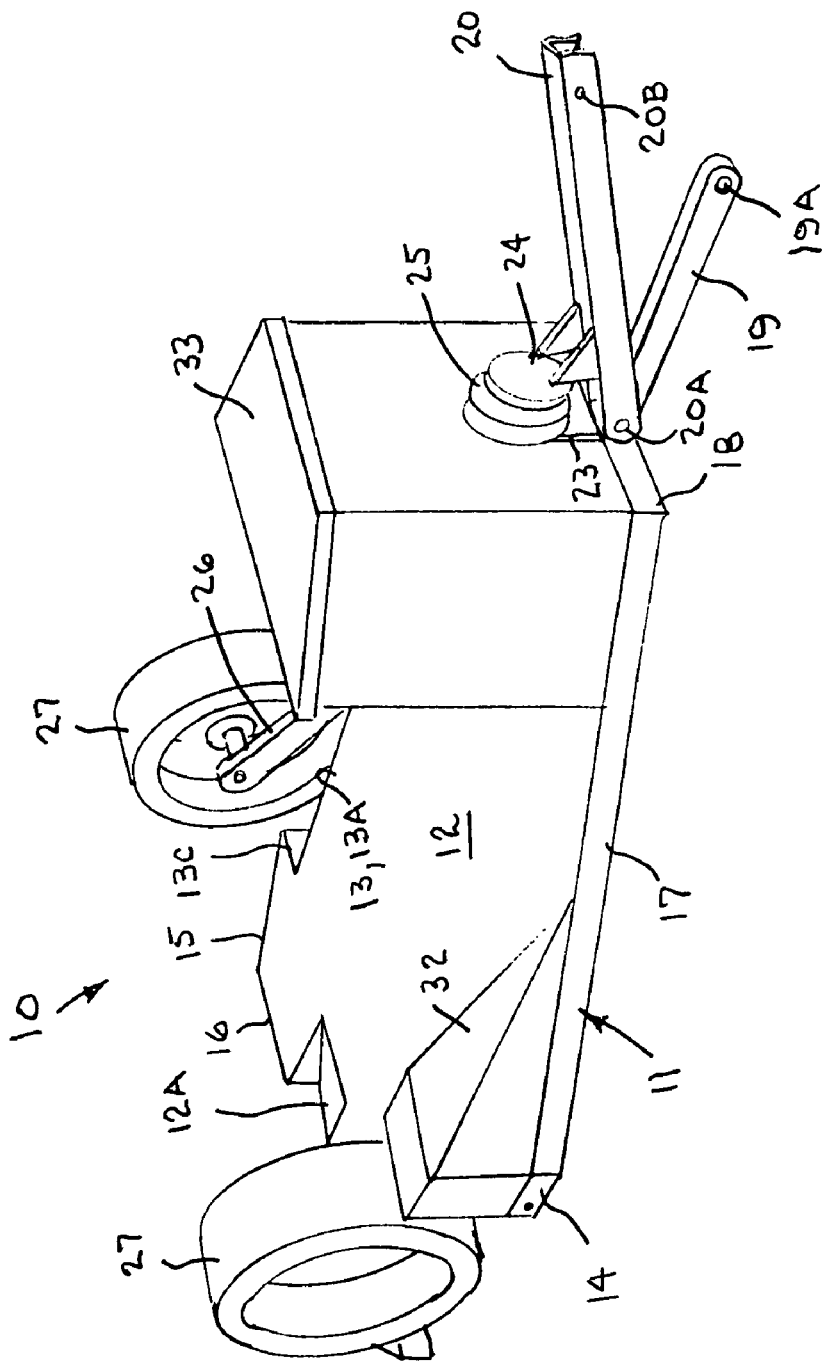
Figure 3:
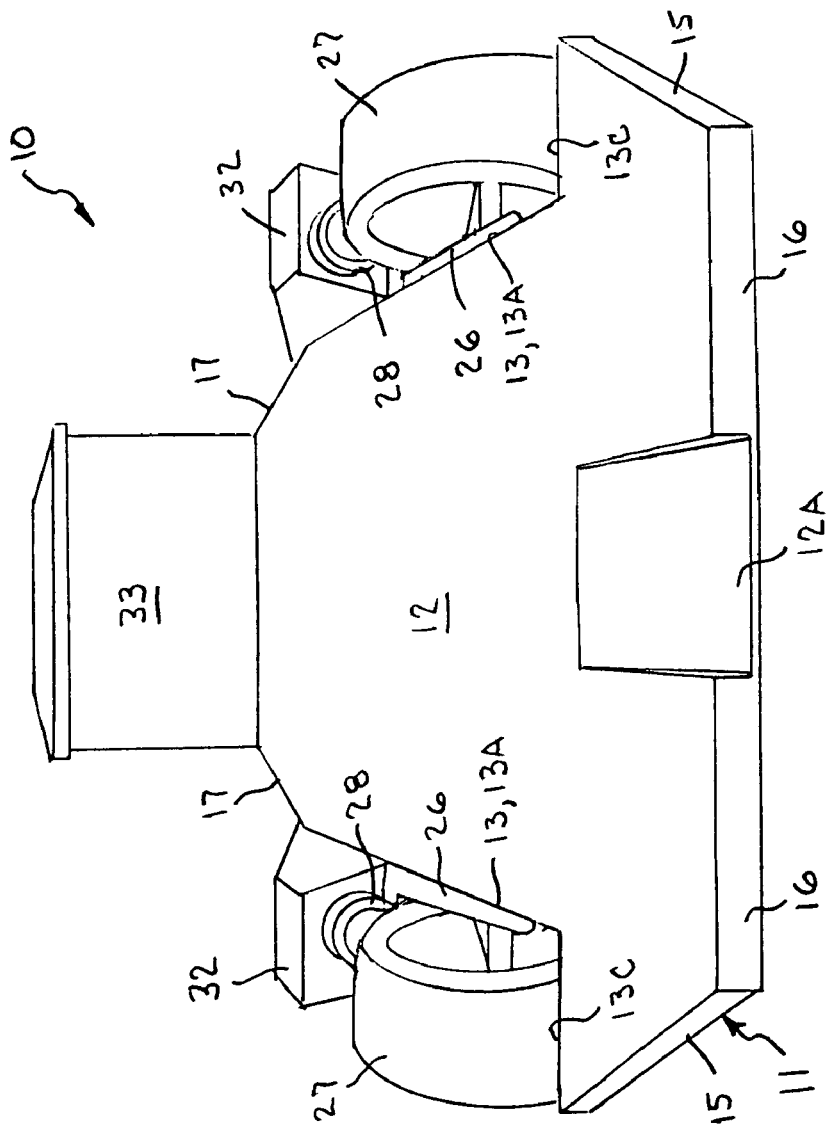
FIGS. 3 and 4 are perspective views of the pneumatic drop frame trailer shown from the rear, in a raised position, and in a lowered position, respectively.
Figure 4:
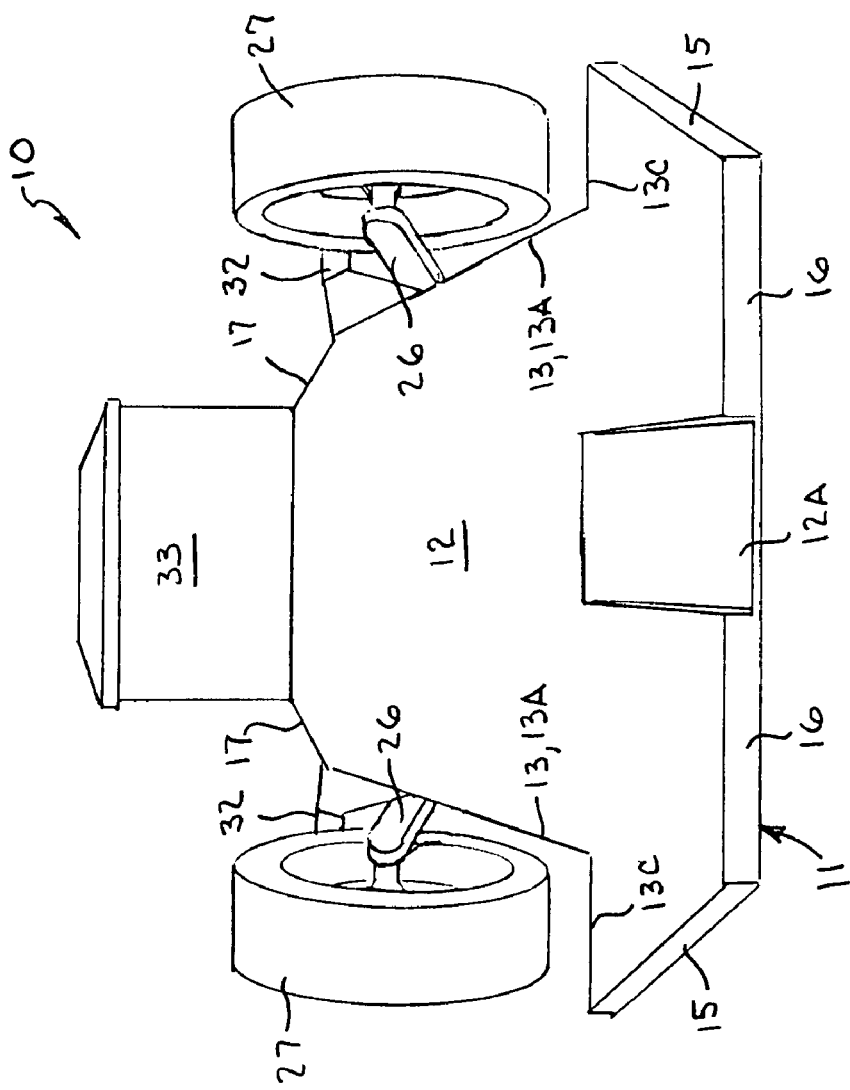
Figure 9:
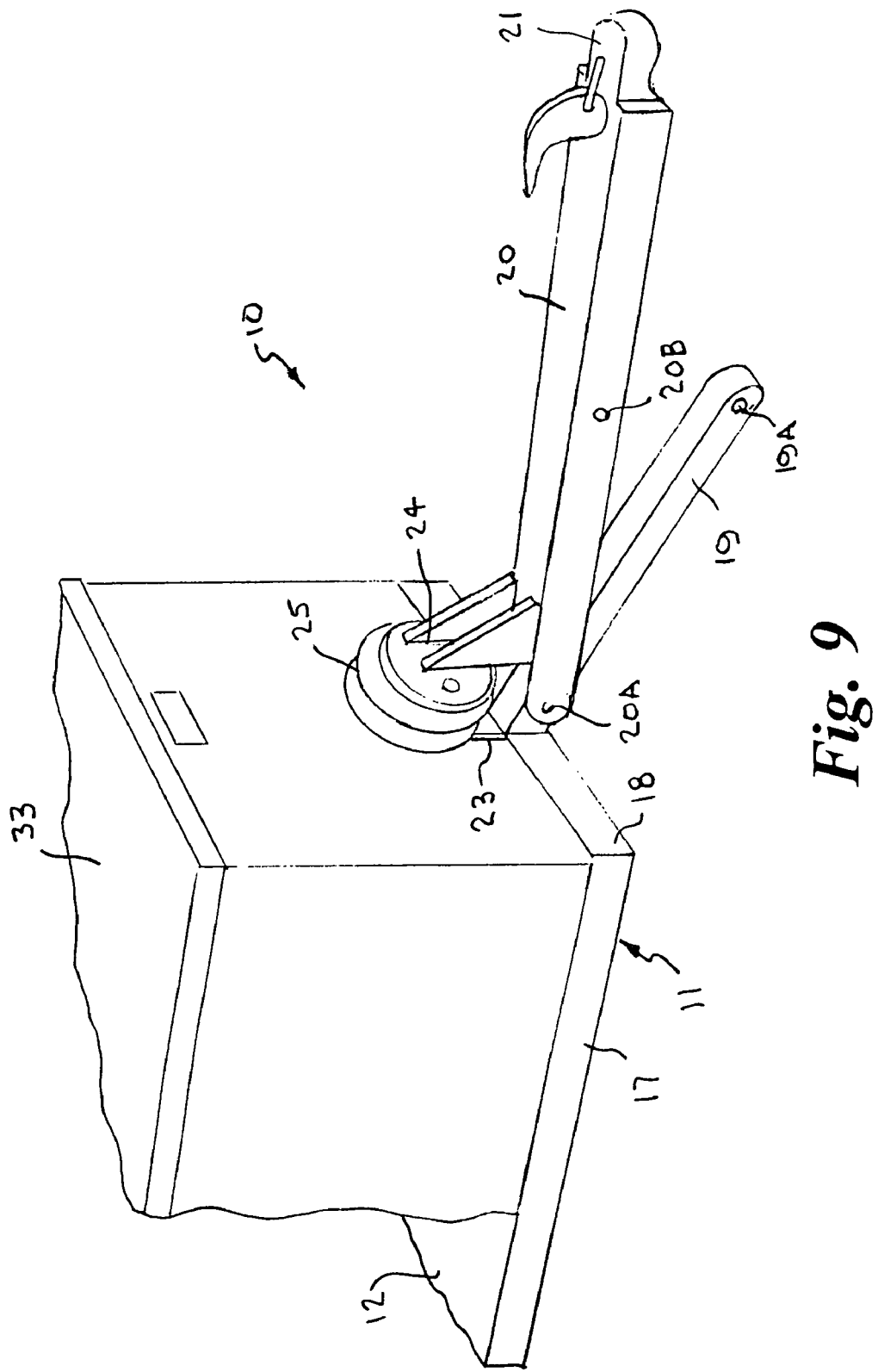
FIG. 9 is a partial perspective view of the front portion of the drop frame trailer showing the front airbag and pivotal tongue.
Figure 10:
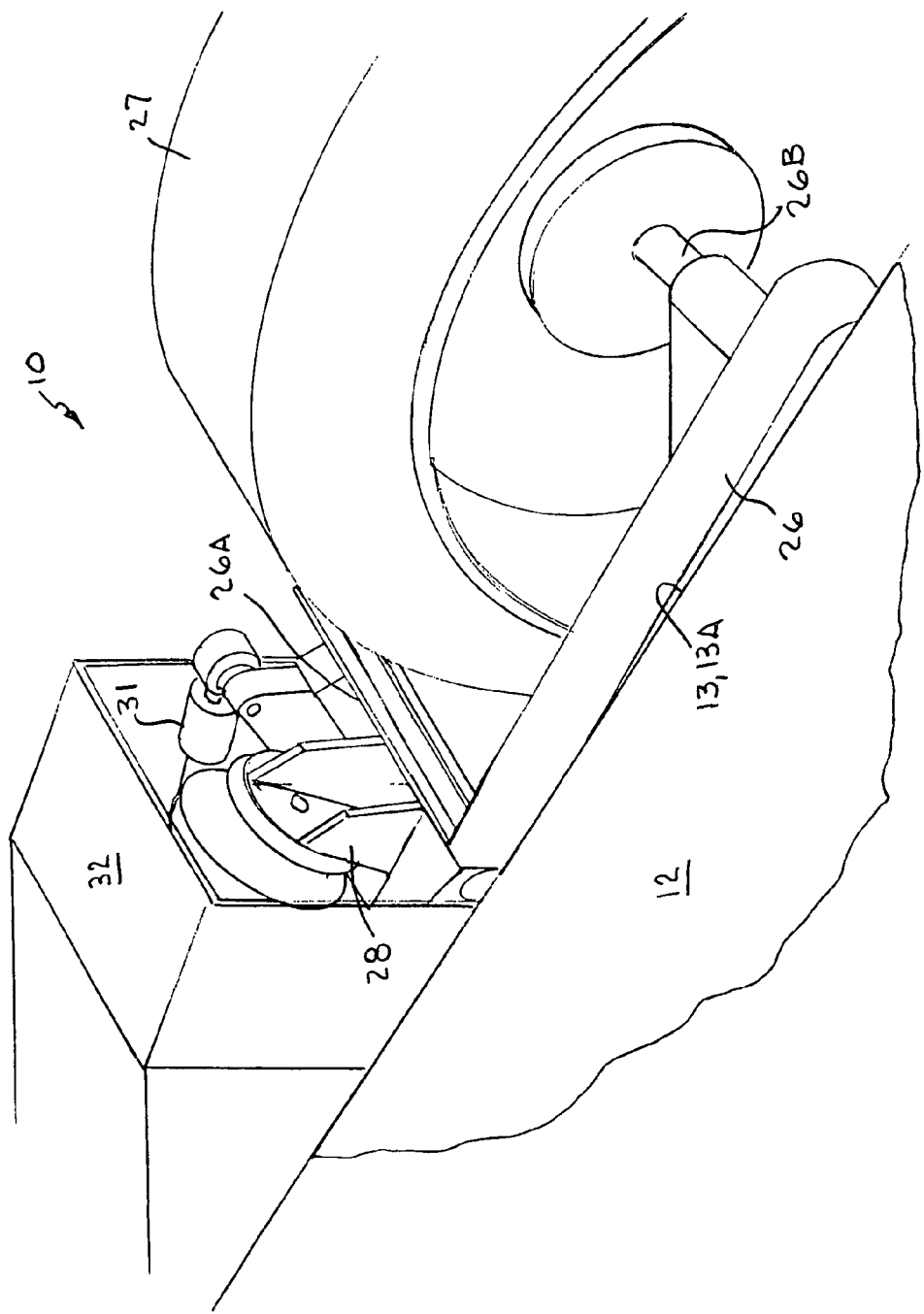
FIGS. 10 and 11 are partial perspective views of the side portion of the drop frame trailer showing the wheel airbag and pivotal wheel support arm in a raised and lowered position, respectively.
Figure 11:
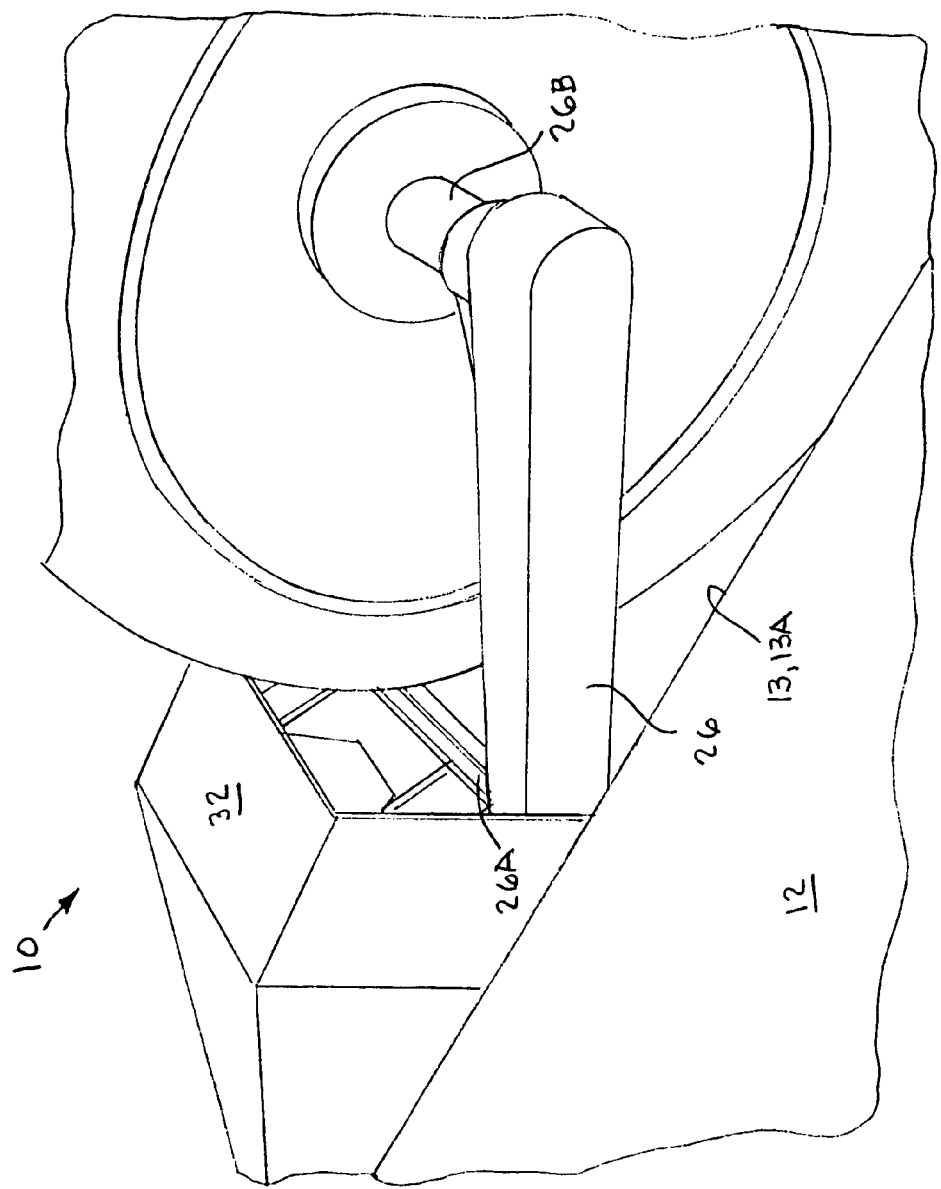

Referring to the drawings by numerals of reference, there is shown in FIGS. 1 through 11, a preferred trailer 10 in accordance with the present invention. The trailer 10 has a chassis or frame 11 of tubular beam construction upon which a metal deck 12 is secured. The longitudinal sides of the frame and deck have laterally opposed rectangular recesses 13, each having an inner side 13A, a forward end 13B and a rearward end 13C. A pair of parallel spaced lateral beams 14 spaced outwardly of the inner side 13A of the recesses 13 have rearward ends that extend a short distance rearwardly beyond the forward end 13B of the recesses.

A pair of angularly disposed beams 15 extend angularly rearward and inwardly from the rearward ends of the recesses 13 and are adjoined at their forward ends by a pair of laterally spaced apart transverse rear beams 16. The rear portion of the metal deck 12 has a center ramp portion 12A that extends angularly downward and rearward and terminates between the laterally spaced beams 16 substantially flush with the bottom of their inward facing ends.

A pair of angularly disposed beams 17 extend angularly forward and inwardly from the forward ends of the lateral beams 14 and are adjoined at their forward ends by a transverse front beam 18. A tongue support beam 19 extends a short distance forwardly from the center of the transverse front beam 18.

An elongate tongue 20 formed of an inverted U-shaped channel is pivotally connected at its rearward end to the rearward portion of the tongue support beam 19 by a pivot pin 20A. A conventional trailer hitch 21 is secured to the forward end of the tongue 20 for securing the trailer to a towing vehicle. The tongue 20 is pivotally movable between a horizontal superposed nested position over and coextensive with the tongue support beam 19 and an upward angularly disposed position relative thereto, and to the frame 11. The tongue 20 is selectively secured in the horizontal nested position by a latch pin 22 installed through holes 20B in its side walls and a matching transverse hole 19A at the forward end of the tongue support beam 19.

A first upstanding bracket 23 is secured to the transverse front beam 18 at the center thereof, and a second upstanding bracket 24 is secured to the tongue 20 near its rearward end. An inflatable bladder-type air cylinder or airbag 25 is secured at each end between the first and second brackets 23 and 24 such that inflation of the airbag pivots the tongue 20 to its horizontal nested position over and coextensive with the tongue support beam 19, and deflation allows the tongue to assume its upward angularly disposed position relative to the frame 11.

A pair of wheel support arms 26 are disposed in the rectangular recesses 13, respectively, and are pivotally connected at their forward ends to the trailer frame 11. Each wheel support arm 26 has a transverse pivot rod or tube 26A at its forward end that is pivotally connected between the rearward end of the lateral beam 14 and the inner side 13A of the respective recess 13. The rearward end of each wheel support arm 26 is provided with a short outwardly facing stub axle or spindle 26B upon which a wheel 27 is rotatably mounted in a conventional manner.

A first upstanding bracket 28 is secured to the transverse pivot tube 26A at the forward end of each wheel support arm 26, and a second upstanding bracket 29 is secured to the frame 11 at the forward end 13B of the respective recess 13. An inflatable bladder-type air cylinder or airbag 30 is secured at each end between the first and second brackets 28 and 29 such that inflation of the airbag pivots the rearward end of the wheel support arm 26 and wheel 27 to a lowered position relative to the frame 11, and deflation allows the rearward end of the wheel support arm and wheel to assume a raised position relative to the frame.

The wheel support system may also preferably include a shock absorber 31 connected between the wheel support arm 26 and the frame 11, and the airbags 25 and 30 may be covered with protective covers 32.

The wheel airbags 30 may be inflated to selectively place the axles, and therefore the wheel centers substantially at the same level as the deck, or above or below it, as one chooses, and may also be inflated to provide the desired stiffness or shock absorbing characteristics for absorbing road shocks as the trailer is towed. The front airbag 25 disposed between the tongue and frame 11 may be inflated or deflated to allow the frame and deck to be selectively raised and lowered with respect to the tongue and/or the towing vehicle.

When the airbags 25 and 30 are deflated, the axles and wheel centers are significantly above the deck, and the bottom of the frame 11 is disposed substantially horizontally and supported on the ground surface in a loading and unloading position, and the tongue 20 is disposed angularly between the frame and the towing vehicle.

Thus, a significant benefit of this invention is that, when the trailer is hitched to a tow vehicle, the load supporting deck 12 can be lowered evenly and horizontally positioned very close to the ground, and the rearward end of the small ramp portion 12A of the deck is substantially flush with the ground surface to facilitate moving items onto and off of the deck.

A control box 33 is disposed on the deck at the front end and contains an air compressor, an air storage tank, and associated control elements including appropriate valves (conventional and not shown) for inflating and deflating the airbags 25 and 30 and adjusting the pressure as desired to raise and lower the frame 11 and tongue 20. The airbags 25 and 30 are connected via conduits (not shown) with the air storage tank through associated control valves. The wheel airbags 30 are connected via conduit so as to be inflated simultaneously such that the frame is raised and lowered evenly in a horizontal plane. The front or tongue airbag 25 is connected via conduit to the air storage tank through a valve system such that the tongue airbag may be selectively inflated and deflated independently from the wheel airbags 30 or simultaneously with inflation and deflation of the wheel airbags.

While this invention has been described fully and completely with special emphasis upon a preferred embodiment, it should be understood that within the scope of the appended claims the invention may be practiced otherwise than as specifically described herein.

The invention claimed is:

1. A pneumatic drop frame trailer movable between a raised travel position and a lowered loading position, comprising:
    a frame having laterally opposed longitudinal sides, a front end, a rear end, and a top end;
    a generally flat deck having laterally opposed longitudinal sides, a front end and a rear end secured to said frame top end having a rear portion, a center ramp portion disposed at a rear portion of said deck between and a distance inwardly from said laterally opposed longitudinal sides, said ramp portion extending angularly downward and rearward terminating in a bottom end substantially even with a bottom surface of said frame rear end;
    a tongue pivotally connected at a rearward end to said front end and having a hitch at a forward end for connecting said trailer with a tow vehicle;
    first and second wheel support arms each having a forward end pivotally connected to a respective said longitudinal side of said frame;
    first and second ground-engaging wheel assemblies each rotatably mounted on a rearward end of a respective one of said first and second wheel support arms;
    first and second airbags each disposed between a respective one of said wheel support arms and said frame for pivoting said wheel support arms and their associated wheel assemblies relative to said frame;
    a third airbag disposed between said tongue and said frame forward end for pivoting said tongue relative to said frame between a horizontal towing position and a loading and unloading position disposed angularly between said frame and said tow vehicle;
    a source of air supply including an air compressor, an air storage tank and associated pneumatic control means on said frame operatively connected with each of said airbags for selectively inflating and deflating said first and second airbags simultaneously or independently to raise and lower said frame relative to the ground surface and selectively inflating and deflating said third bag independently of, or simultaneously with, said first and second airbags for pivoting said tongue relative to said frame between said horizontal towing position and said angularly disposed loading and unloading position while connected with said tow vehicle; wherein
    deflation of said first and second airbags simultaneously with said third airbag pivots said rearward end of said respective wheel support arm and associated wheel assembly to a raised position relative to said frame and said third airbag pivots said tongue angularly between said frame and said tow vehicle such that said frame is lowered evenly in a horizontal position, and said bottom surface of said frame is supported substantially horizontally on the ground surface in said loading and unloading position with said bottom end of said ramp portion of said deck substantially flush with the ground surface to facilitate moving items onto and off of said deck;
    inflation of said first and second airbags simultaneously with said third airbag pivots said rearward end of said respective wheel support arm and associated wheel assembly to a lowered position relative to said frame and said third airbag pivots said tongue to a horizontal position such that said frame is raised evenly in a horizontal position and supported horizontally above the ground surface in said towing position; and
    air pressure in said first and second airbags is selectively adjusted independently to provide stiffness and shock absorbing characteristics for absorbing road shocks as said trailer is towed.

2. The pneumatic drop frame trailer according to claim 1, wherein
    said frame front end has a transverse front beam disposed said laterally opposed longitudinal sides, and a tongue support beam extending a short distance forwardly from a center of said transverse front beam;
    said tongue is formed of an inverted generally U-shaped channel pivotally connected at a rearward end to a rear portion of said tongue support beam to be pivotally movable between a horizontal superposed nested position over and coextensive with said tongue support beam and an upward angularly disposed position relative thereto, and to said frame;
    said tongue and said tongue support beam having mating transverse holes through their respective side walls; and
    said tongue is selectively secured in said horizontal nested position by a latch pin removably installed through said mating transverse holes.

3. The pneumatic drop frame trailer according to claim 2, wherein
    said transverse front beam has a first upstanding bracket secured at the center thereof, and said tongue has a second upstanding bracket secured near its said rearward end; and
    said third airbag is secured at opposed ends between said first and second upstanding brackets such that inflation of said third airbag pivots said tongue to its said horizontal nested position over and coextensive with said tongue support beam, and deflation thereof allows said tongue to assume its said upward angularly disposed position relative to said frame.

4. The pneumatic drop frame trailer according to claim 1, wherein
    said longitudinal sides of said frame and deck each have laterally opposed rectangular recesses, each recess having an inner side, a forward end, and a rearward end, a pair of parallel spaced lateral beams spaced outwardly of said the inner side of said recesses, each having rearward ends that extend a short distance rearwardly beyond said forward end of said recess, a pair of angularly disposed beams extending angularly rearward and inwardly from respective said rearward ends of said recesses adjoined at forward ends by a pair of laterally spaced apart transverse rear beams having opposed facing inward ends; and
    said center ramp portion bottom end terminates between said laterally spaced apart transverse beams substantially flush with a bottom of said opposed facing inward ends thereof.

5. The pneumatic drop frame trailer according to claim 4, wherein said first and second wheel support arms are each disposed in a respective said rectangular recess, and are pivotally connected at said forward ends to said frame, each said wheel support arm having a transverse pivot rod or tube at its forward end pivotally connected between said rearward end of a respective said lateral beam and an inner side of said respective recess;

said first and second wheel support arms each has an outwardly facing stub axle or spindle at a rearward end upon which a respective said wheel assembly is rotatably mounted;

each said pivot rod or tube has a first upstanding bracket secured thereto, and a second upstanding bracket is secured to said frame at said forward end a respective said recess; and said first and second airbags are each secured at opposed ends between respective said first and second upstanding brackets such that inflation thereof pivots said rearward end of the respective said wheel support arm and wheel assembly to a lowered position relative to said frame, and deflation thereof allows said rearward end of the respective said wheel support arm and wheel assembly to assume said raised position relative to said frame.

6. The pneumatic drop frame trailer according to claim 1, further comprising:

a shock absorber connected between each said wheel support arm and said frame.

* * * * *